United States Patent [19]
Mattson et al.

[11] 3,805,912
[45] Apr. 23, 1974

[54] WHEELED AIR CUSHION VEHICLE

[76] Inventors: John Hamilton Mattson; Clyde Wayne Ottinger, both of 620 E. Channel Rd., both of Santa Monica, Calif. 90402

[22] Filed: Oct. 22, 1971

[21] Appl. No.: 191,749

[52] U.S. Cl............ 180/118, 152/155, 152/416
[51] Int. Cl............................................ B60v 1/00
[58] Field of Search.......... 180/116, 117, 118, 119, 180/120, 121; 152/155, 156, 416, 418, 419

[56] References Cited
UNITED STATES PATENTS

| | | | |
|---|---|---|---|
| 3,478,835 | 11/1969 | Bertin | 180/121 |
| 2,216,854 | 10/1940 | Sanford | 152/416 |
| 2,211,935 | 8/1940 | Parker | 152/418 |
| 2,552,031 | 5/1951 | Booth | 152/418 |
| 3,238,988 | 3/1966 | Roque | 152/156 |
| 2,664,935 | 1/1954 | Des Rosiers | 152/339 |
| 3,108,520 | 10/1963 | Garis | 152/416 |
| 2,715,430 | 8/1955 | Lindeman | 152/416 |
| 2,912,032 | 11/1959 | Alexander | 152/6 |
| 1,185,986 | 6/1916 | Collins | 152/156 |
| 3,536,155 | 10/1970 | Bertin | 180/116 |

*Primary Examiner*—Gerald M. Forlenza
*Assistant Examiner*—D. W. Keen
*Attorney, Agent, or Firm*—Harris, Kern, Waller & Tinsley

[57] ABSTRACT

A vehicle with low surface loading for off-road use. A vehicle having a plurality of air cushion plenums and a plurality of wheels with low pressure tires. A control system for selectively controlling plenum flow rates and tire pressures for pitch, roll and yaw control, for trim and for steering with various loads and over various terrains. Means for changing the relationship of plenum control and tire control and means for changing overall plenum rate and overall tire pressure for footprint variation. A variable volume, constant pressure tire system for moving over obstacles without tilting the vehicle. Tires with non-rigid casings and internal tension members and having a tread diameter many times the hub diameter for use in the variable volume, constant pressure configuration. A vehicle suitable as a tractor and as a trailer.

10 Claims, 12 Drawing Figures

PATENTED APR 23 1974 3,805,912

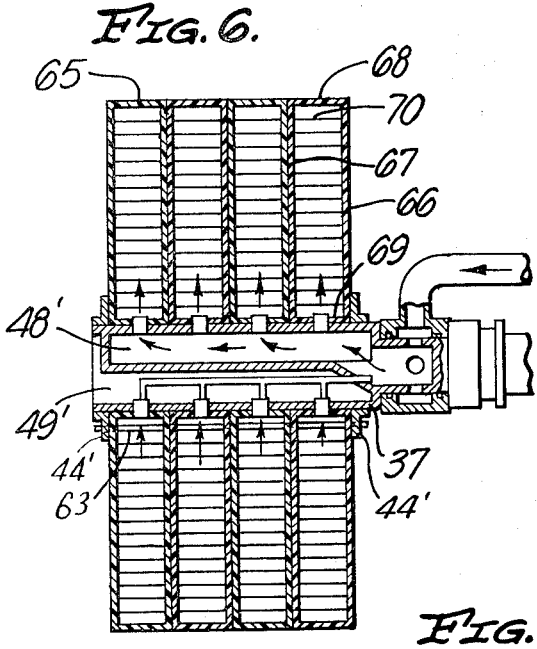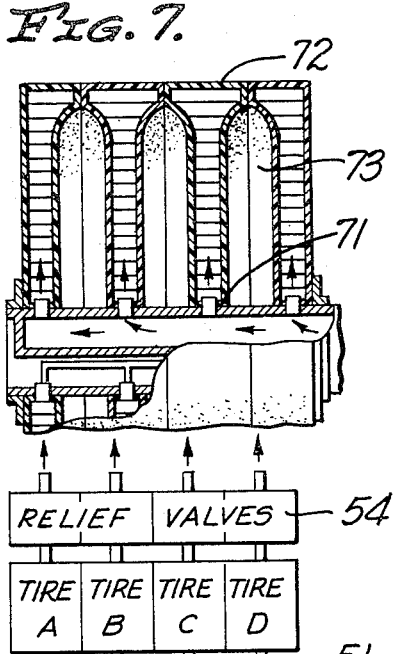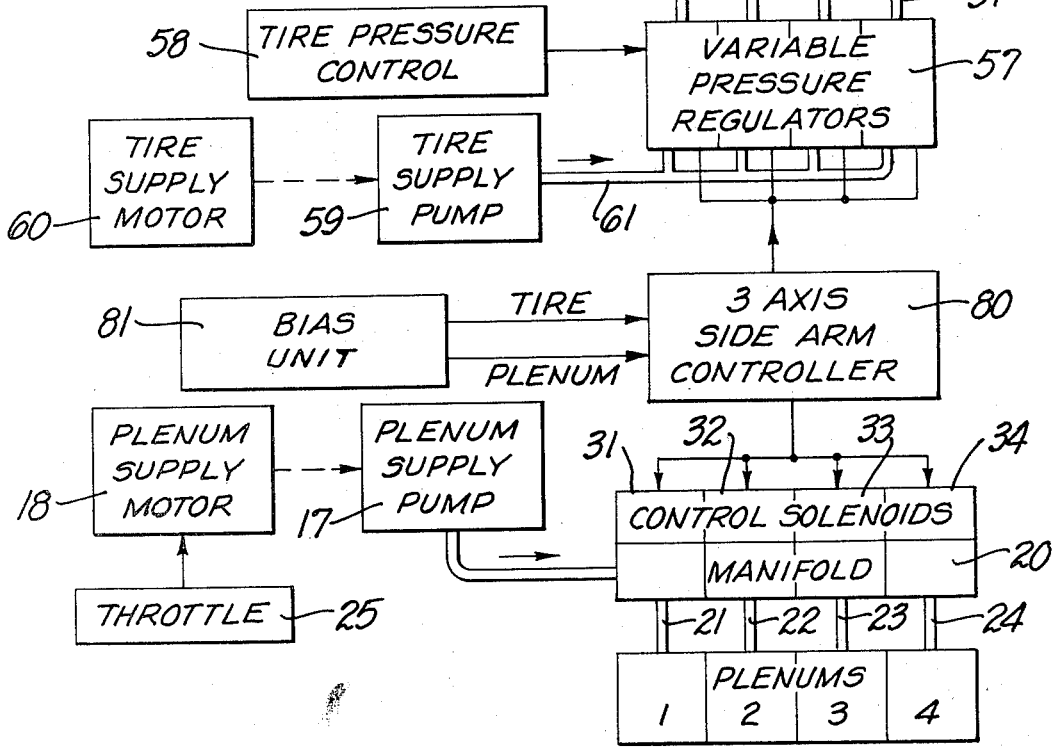

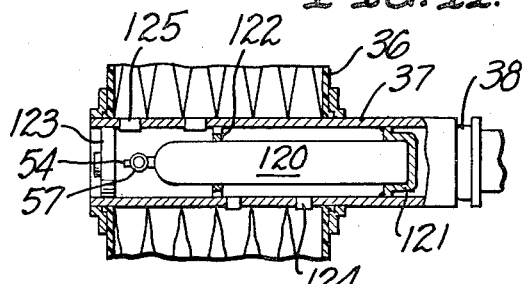
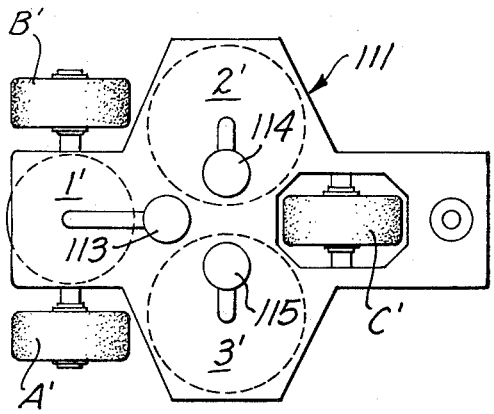
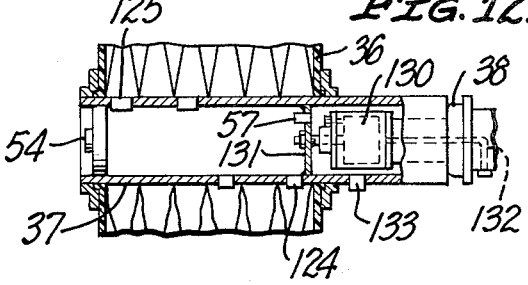
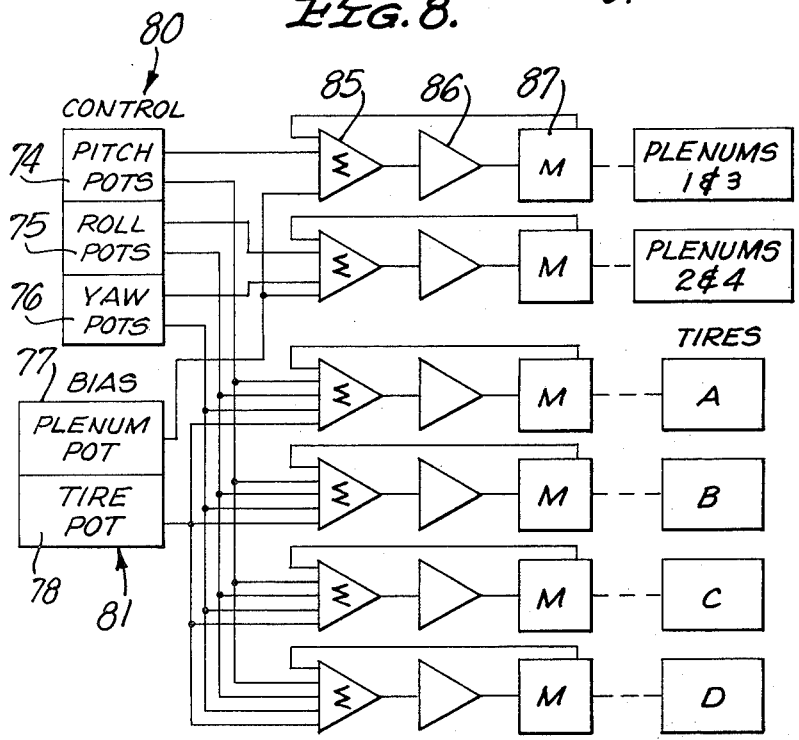
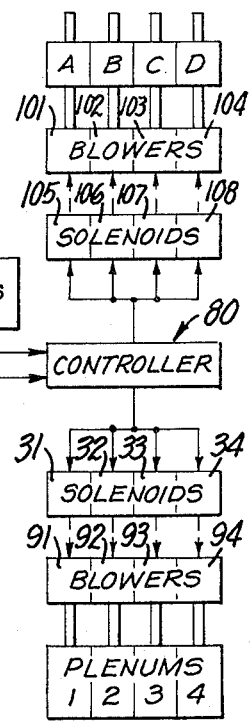

WHEELED AIR CUSHION VEHICLE

BACKGROUND OF THE INVENTION

This invention relates to vehicles with low surface loading for off road use, such as soft earth, snow and sand. The vehicle of the invention is particularly suited for use on tundra for minimum disturbance of the surface while being capable of moving large loads over open country with varying terrain.

In the past, surface loading in off road vehicles has been reduced by using large tires of conventional design and operating at lower than conventional pressures. Air cushion vehicles have lower surface loading and the air cushion design has been utilized with conventional wheels and tires. Problems of stability, trim and steering are encountered, particularly when moving over obstacles such as rocks, logs, hummocks and the like.

SUMMARY OF THE INVENTION

The vehicle includes plenums and wheels and a combined control system for the plenums and tires. The control system provides for varying overall plenum flow rate and overall tire pressure and for selectively varying plenum flow rate and tire pressure to achieve pitch, roll and yaw control of the vehicle and to control the tire footprint size. A single control lever is provided for selectively varying plenum rate and tire pressure, and the relative effect of control lever movement on plenum rate and tire pressure may be adjusted by an additional bias control. A variable volume, constant pressure tire permits movement of the vehicle over obstacles without tilting the vehicle, with a relief valve exhausting air from the tire as the volume reduces on encountering an obstacle and with a regulator introducing additional air into the tire to maintain the pressure as the tire volume increases after passing over the obstacle. A tire with a non-rigid casing and internal tension members functions to transmit torque and maintain the tire configuration under normal conditions while readily permitting the reduction and increase in tire volume while passing over an obstacle. Variations in the overall system and in the wheel and tire design are shown. A tractor vehicle is shown; however the invention is also intended for use as a trailer.

It is an object of the present invention to provide such a new and improved vehicle and control system therefor, and it is a particular object to provide a new and improved tire and the variable volume, constant pressure operating mechanism.

DESCRIPTION OF THE DRAWINGS

FIG. 5 is a diagram of the control system for the vehicle of FIG. 1;

FIG. 6 is a view similar to that of FIG. 3 showing an alternative form of tire construction;

FIG. 7 is another view similar to that of FIG. 3 showing another alternative form of tire construction;

FIG. 8 is a diagram illustrating a portion of the control system of FIG. 5 in greater detail;

FIG. 9 is a diagram illustrating an alternative form of the control system;

FIG. 10 is a view similar to that of FIG. 2 illustrating an alternative embodiment of the vehicle; and FIGS. 11 and 12 are views similar to that of FIG. 3, illustrating alternative embodiments of wheel construction.

DESCRIPTION OF THE PREFERRED EMBODIMENTS

Figure 1:
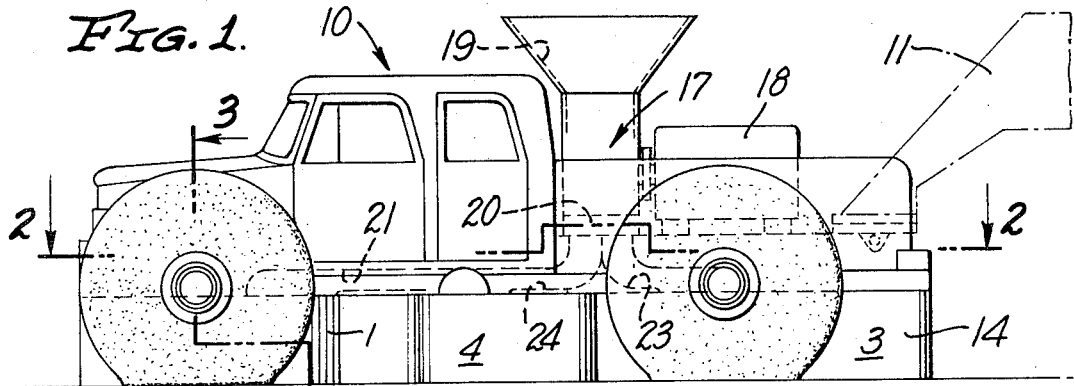
FIG. 1 is a side view of an off road vehicle incorporating a preferred embodiment of the invention.

The tractor vehicle of the invention may utilize a conventional truck 10 with engine, drive train to the wheels, throttle, steering and braking. Differential braking may be incorporated for steering action also. Four wheel steering may be used if desired. Such mechanisms are conventional and are not shown in the drawings. The pay load may be carried directly on the truck 10 and/or by a trailer 11, indicated in phantom lines in FIG. 1. The trailer may incorporate the air cushion plenums, the variable volume, constant pressure tires, and a control system therefor as in the tractor vehicle, if desired. Also, a trailer vehicle incorporating the invention may be pulled by a conventional tractor vehicle.

The truck 10 is modified by the substitution of special wheels 12 with tires A, B, C, D at the right front, right rear, left front, and left rear, respectively, of the vehicle. The truck is also modified by the addition of four air cushion plenums 13, referred to as plenums 1, 2, 3 and 4 at the front, right, rear, and left, respectively, of the vehicle. The plenums 13 may be conventional in design, each comprising a large chamber enclosed by a skirt 14.

Air is supplied to the plenums by a pump 17 driven by a motor 18, with the pump disposed in an inlet duct 19 upstream from a control manifold 20, with outlet ducts, 21, 22, 23, 24, feeding the plenums 1, 2, 3, 4, respectively. Air is supplied to the plenums at a relatively high volume and a relatively low pressure, typically in the range of zero to one psi, with a normal operating range between 0.1 and 0.6 psi. The overall plenum air rate of flow and thereby the pressure may be controlled by a throttle 25 for the plenum motor 18.

A means is provided for selectively controlling the air flow to the plenums and various of the presently available systems may be used. In one arrangement, the manifold 20 may have outlet gates for each of the conduits 21-24, with each gate controlled by a solenoid 31-34, respectively. In an alternative arrangement, fluid control may be utilized such as by arranging the four outlet ducts parallel with each other and generally coaxial with the inlet duct at the manifold and providing around the periphery outlets for flow deflecting jets, with flow of high pressure fluid to the jets controlled by the solenoids 31-34. In another arrangement, the inlet duct may be centered over four outlet ducts arranged in a cruciform pattern, with the inlet duct being movable relative to the outlet ducts to discharge more air into one outlet and less into the opposite outlet. Other mechanisms for controlling distribution of air to the individual plenums will be readily apparent to those skilled in the control of air flow.

Each of the wheels 12 includes a tire 36 mounted on a hub 37 (FIGS. 3 and 4), with the wheel mounted on the truck at 38 in place of the conventional wheel. The tire 36 includes a non-rigid, collapsible casing 39 with generally parallel side walls 40, 41 and a peripheral tread 42, with flanges 43 at the inner edges of the side walls for clamping to the hub 37, as by clamp flange members 44. Typically the casing may be formed of a thin fabric such as nylon reinforced neoprene and may be in the order of a tenth of an inch thick.

Figure 4:
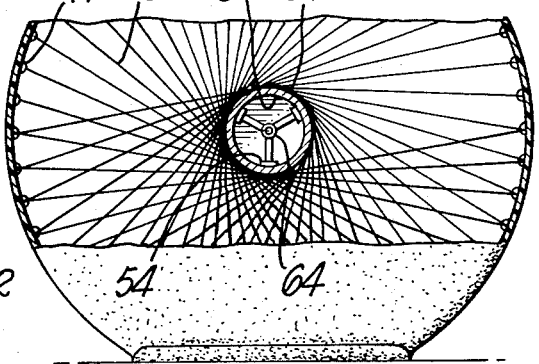
FIG. 4 is a partial sectional view taken along the line 4—4 of FIG. 3.

A plurality of tension members 46 is provided within the casing, typically formed of nylon cord or the like. The tension members 46 may be affixed to the inner surface of the tread 42, as by being fixed to or passing through eyelets 47 carried in the tread section 42 of the casing. The tension members 46 are affixed to the hub 37, as by looping around the hub as shown in FIG. 4 and clamping in position.

The hub 37 has an inner chamber 48 and an outer chamber 49, with a portion of the inner chamber rotating within a housing 50. Air is supplied to the inner chamber 48 via a conduit 51 and the housing 50, passing through one or more openings 52 in the hub. Air flows from the inner chamber 48 into the tire 36 through one or more check valves 53 carried in the hub. One or more relief valves 54 are carried in the hub and serve to exhaust air from the tire through the chamber 49 to the atmosphere when pressure in the tire exceeds the setting of the relief valves.

The tires normally are operated in the range of 1 to 3 psi and the pressure in the line 51 to a tire is controlled by a pressure regulator 57. Desirably, means are provided for varying the setting of the four tire pressure regulators 57 providing a control for the overall tire pressure and the tire footprint area with various load and operating conditions. This may be accomplished by conventional electrical or mechanical means and the tire pressure control is indicated at 58. The air for the tires may be provided from a pump 59 driven by a motor 60, with the pump outlet connected to the regulators 57 via conduit 61. Under normal operating conditions, the pressure at which the relief valves 54 exhaust air from a tire is made higher than the outlet pressure setting of the regulator 57, typically 10 percent higher. When the setting of the pressure regulator is changed, it is preferable to have the setting of the relief valve correspondingly changed, and this may be accomplished by coupling the outlet pressure of the regulator directly to the reference side of the relief valve, as by a line 64 from the chamber 48 to the relief valves 54.

The tire 36 has a large outside diameter and a small inside diameter, typically being 6 feet O.D. and 1 foot I.D., and is relatively wide, typically in the order of 2½ feet. This tire configuration permits a large change in volume as the tire passes over an obstacle, with a volume change in the order of one-third the total tire volume available. In operation, the casing of the tire provides for retention of the air under pressure, with the side walls of the casing and the tension members 46 providing the driving force for moving the vehicle.

A conventional vehicle is tilted as a wheel moves over an obstacle and such tilting is undesirable in air cushion vehicles and in vehicles having low surface loading. Tilting produces undesired variations in the gap between the plenum skirts and the surface and also varies the loading on the individual wheels, increasing the loading at some above the desired level. In contrast, when a tire of the vehicle of the invention encounters an obstacle, the tire is deformed with a reduction in tire volume and an initial increase in tire pressure. However, as the tire pressure tends to build up above the setting of the relief valve, air is exhausted from the tire so that the pressure remains constant as the volume continues to reduce. The non-rigid tire tends to absorb or envelop the obstacle, while the wheel hub and hence the vehicle moves forward horizontally without significant vertical movement. After the wheel has passed over the obstacle, the tire begins to expand in volume and the tire pressure starts to drop. The pressure regulator provides additional air to the tire to maintain the desired constant pressure as the volume increases to the normal volume.

Figure 3:
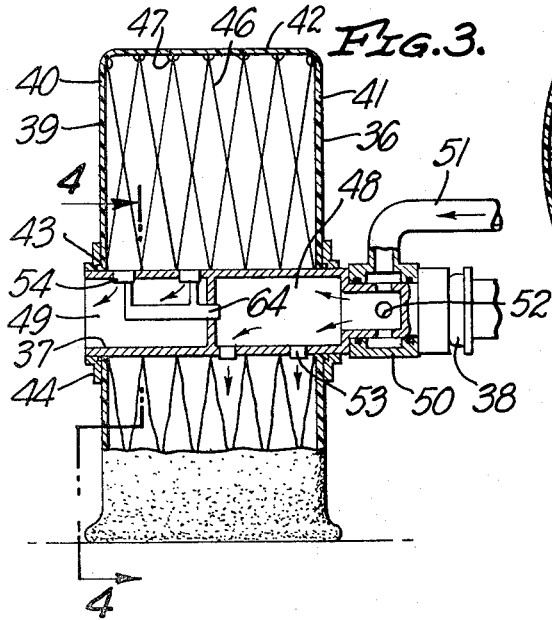
FIG. 3 is an enlarged partial sectional view taken along the line 3—3 of FIG. 1, illustrating the wheel construction.

An alternative tire construction is illustrated in FIG. 6, where components corresponding to those of FIGS. 3 and 4 are identified by the same reference numerals. A plurality of tire units 65 (four units in FIG. 6) are mounted side by side on the hub 37, typically being held in position by a plurality of retainer bars 63 positioned around the hub 37, between flange members 44'. Each tire unit has at least one inlet check valve 53 and at least one outlet relief valve 54. Each of the tire units 65 is a generally annular shaped unit with side walls 66, 67, an outer sleeve or tread 68, and an inner sleeve 69. A plurality of tension members 70 are connected between the side walls 66, 67. The tire casing and tension members may be formed of the same materials as used with the tire 36 of FIGS. 3 and 4. The tire units preferably are adhered to each other at the adjoining side walls, as by cementing, and an outer overall sleeve may be applied across all of the tire units if desired. The tension members 70 provide lateral stiffness for the tire while the side walls provide for torque transmission, with the open, non-rigid construction readily permitting the substantial reduction in volume for moving over obstacles.

The tire of FIG. 7 is quite similar to the tire of FIG. 6, but is designed to have a reduced radial stiffness permitting easier obstacle penetration. Each tire unit has a wider outer face, as at 72, with a narrower inner face, as at 71.

The vehicle includes a controller 80 for selectively controlling the flow rate to each of the plenums and for selectively controlling the pressure in each of the tires. This controller provides the operator with control over the pitch, roll and yaw of the vehicle. A conventional three-axis side arm controller is preferred, but it will be noted that a two-axis controller could be used if desired. The controller typically may be a joy stick which is movable fore and aft for pitch control, movable side to side for roll control, and twistable about a generally vertical axis for yaw control, with all three motions being possible simultaneously. In an alternative configuration, the roll and pitch control may be obtained with a two-axis joy stick and the yaw control may be obtained with the vehicle steering wheel.

The fore and aft movement of the stick may drive a first pair of potentiometers 74, the lateral movement may drive a second pair of potentiometers 75, and the rotational movement may drive a third pair of potentiometers 76, with one potentiometer of each pair providing for plenum control and the other providing for tire control (FIG. 8). The tire fore and aft or pitch potentiometer develops an electrical signal which may be used to control the pressure regulators 57 to increase the inlet pressure for the rear tires and decrease the inlet pressure for the front tires when the stick is moved forward, calling for a pitch down condition. Similarly, when the stick is moved backward, the pressure setting for the front tires is increased and the pressure setting for the rear tires is decreased, calling for a pitch up condition. The pitch down condition provides for increased traction on the front wheels and permits compensation for a rearward center of gravity condition which might result from asymmetrical load positioning or wind loading on the vehicle or operation on a slope. Similarly, the pitch up condition provides for increase in traction on the rear wheels and permits compensation for a forward center of gravity condition.

The plenum fore and aft or pitch potentiometer provides electrical signals for the fore and aft plenum control solenoids 31 and 33, with a forward movement of the stick providing an increase in flow rate to the aft plenum 3 and a decrease in flow rate to the front plenum 1 to produce a pitch down condition with the same effect as the pitch down condition produced by tire pressure change. Similarly, backward movement of the stick produces a pitch up condition with an increase in flow rate to the forward plenum 1 and a decrease in the aft plenum 3.

The magnitude of change in tire pressure for a given movement of the controller may be varied, as by varying the gain in the control system or by varying the voltage across the controller potentiometer. A bias unit 81 is provided for the vehicle operator permitting him to set the ratio between controller movement and tire pressure change and also the ratio between controller movement and plenum flow rate change. The bias unit can have the tire and plenum controls coupled together so that as one is increased the other is decreased or the tire and plenum controls can be operated separately so that both can be set at maximum or minimum or any desired intermediate condition independently of the other. In the specific embodiment illustrated in FIG. 8, the bias unit 81 includes a potentiometer 77 for the plenum control and a potentiometer 78 for the tire control.

A typical electrical control system is illustrated in FIG. 8. The plenum output from the pitch potentiometer 74 and the output from the plenum potentiometer 77 are connected as inputs to a summing amplifier 85. The output of the summing amplifier is connected to a power amplifier 86 which in turn drives a motor or other form of actuator 87 which controls the air flow to plenums 1 and 3. One or more feedback signals may be provided from the motor 87 to the input of the summing amplifier 85. Position feedback and rate feedback may be utilized as desired. The selection of the particular type of motor or actuator at 87 will depend upon the physical configuration utilized for control of flow and in the system illustrated in FIG. 5, the motor 87 would comprise the solenoids 31, 33. In an alternative configuration where an inlet duct is moved toward plenum 1 or toward plenum 3, the motor 87 may be a linear actuator which drives the inlet duct in translation. A similar arrangement with summing amplifier, power amplifier and motor is provided for plenums 2 and 4, with inputs from the plenum signals of the roll potentiometer 75 and yaw potentiometer 76 and plenum bias potentiometer 77.

Similar arrangements are provided for each of the tires, with the motors 87 providing for controlling the tire pressure, as by controlling the setting of the pressure regulators 57 in the system of FIG. 5.

Side to side or lateral movement of the controller provides a similar control about the roll axis of the vehicle. For example, movement of the controller to the left increases the rate of flow to the left plenum 4 while decreasing the flow to the right plenum 2, and increases the pressure setting for the left tires C and D while decreasing the pressure setting for the right tires A and B, producing a roll right condition. This provides an increased traction on the right wheel and permits compensation for a left side center of gravity condition. Rotation of the potentiometers about the vertical axis produces similar results, with a rotation to the left producing the same results as a lateral movement to the left and with a rotation to the right producing the same results as a lateral movement to the right.

It is preferred to have the vertical axis control spring loaded to a center or neutral position, with the fore and aft and side to side controls not loaded to the neutral position. This permits setting the controller at a fore and aft position for the trim of pitch and setting at a lateral position for trim of roll, while permitting use of the rotational movement for steering.

By way of example, if the vehicle is moving straight on level terrain with no asymmetrical forces due to wind or unbalanced center of gravity, actuation of the controller to the left to produce the roll right condition will cause the vehicle to yaw to the left. That is, the vehicle may be steered to the left by moving the controller laterally to the left or by rotating the controller to the left, both of which motions produce the roll right condition. If the vehicle is moving and is tending to yaw to the right because of a roll left condition produced by a slope or a wind load or other asymmetrical loading, the vehicle can be maintained on a straight path by introducing roll right as a trim. This can be done by moving the controller laterally to the left and leaving it set or by rotating the controller to the left and holding it there against the spring loaded return. Pitch trim may be achieved in the same manner with movement of the controller forward or aft.

As an example of the operation of the system, assume that the vehicle is moving up a slope over a soft terrain. A pitch down command is executed by moving the controller forward. This provides additional traction on the front wheels to compensate for the normal shift of traction to the back wheels due to the center of gravity movement caused by the slope. Light axle loading is desired because of the soft terrain and the axle loading is reduced by increasing the plenum air supply by advancing the plenum motor throttle. The bias unit is set to provide relatively low ratio or low authority between the controller and the plenums and with relatively high ratio for the tire pressure regulators so that the forward setting of the controller primarily changes the tire pressures for balancing the traction forces while leaving the axle loading relatively unaffected for optimum soft terrain performance. Optimum tire footprint area and axle loading are obtained with less overall performance loss than that which would result with higher plenum control ratio. If the pitch down condition was sought with plenum control, there would be a loss of lift due to the drop in the forward plenum and an unnecessary and undesirable increase in axle loading.

Another example of the operation of this system, which calls for the opposite setting of the bias unit, is that of traversing relatively hard terrain and either slopes or wind conditions requiring maximized vehicle control forces. The maximum footprint and axle loadings are required in this case for the tires, and the required balancing effects can then be provided through the plenums by setting the bias unit at maximum ratio or authority between the sidearm controller and the tires. Optimum tire footprint area and axle loading is obtained with less overall performance loss than that which would result with higher tire control authority. If the control trim conditions were sought by controlling the tires, there would be a loss in tire footprint area due to the increased pressure in the affected tires and an unnecessary and undesirable loss in tractive force capability.

Variations of conditions can be seen to exist in varying degrees between these two examples which will be accommodated by proper scaling and selectivity in the bias unit's influence on which set of control forces (plenums or tires) should be used for a given off-road terrain operation.

An alternative configuration for the system of FIG. 5 is shown in FIG. 9, wherein separate sources of air for each of the plenums 1–4 and separate sources of air for each of the tires A–D are provided. Blowers or other air sources 91–94 are connected to the plenums 1–4, respectively, with the blower outputs under the control of the solenoids 31–34, respectively. Similarly, blowers or other air sources 101–104 provide air to the tires A–D, respectively, with the blower outputs under the control of solenoids or other motors or actuators 105–108, respectively. The solenoids 31–34 and 105–108 may be controlled by the controller 80 and bias unit 81, as previously described.

An alternative form of vehicle 111 is shown in FIG. 10, having plenums 1', 2', and 3' and wheels A', B' and C'. In this embodiment, each plenum is fed from a separate blower 113, 114, 115, although the single blower configuration of FIGS. 1 and 2 can be used if desired. Also, the plenums are made circular in plan form, which simplifies the skirt construction but reduces the area for a given vehicle outline.

Figure 2:
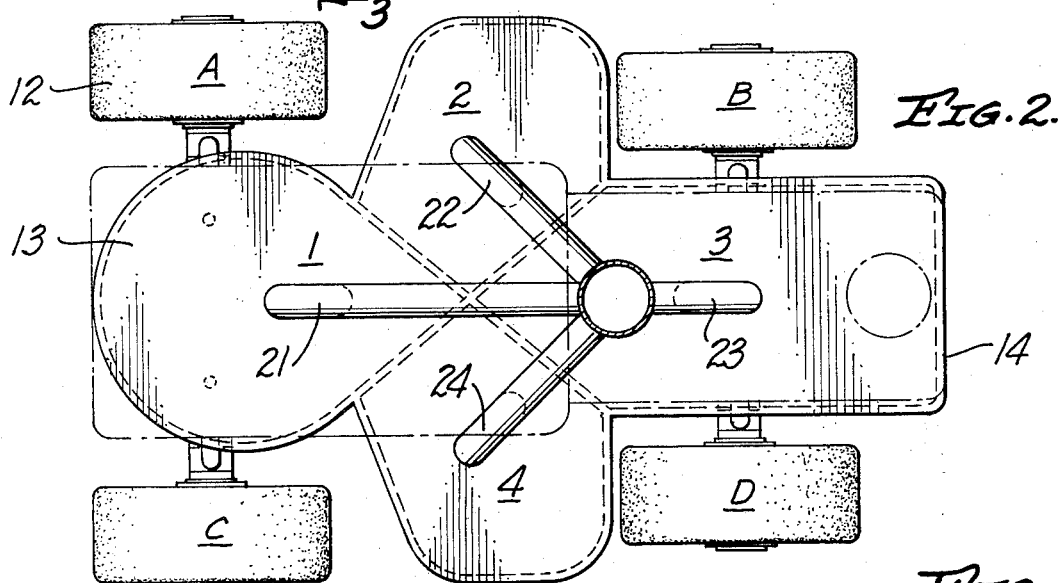
FIG. 2 is a sectional view taken along the line 2—2 of FIG. 1.

The operation of the vehicle of FIG. 10 is the same as that of the vehicle of FIGS. 1 and 2, with pitch control being achieved by varying the flow rate to plenum 1' with respect to plenums 2' and 3' and by varying the flow rate to tires A' and B' with respect to tire C'. Roll and yaw are controlled by varying the flow rate to plenum 2' with respect to plenum 3' and by varying the flow rate to tire A' with respect to tire B'. By way of example, a pitch up and roll right condition is achieved by increasing the flow to plenums 1' and 3' and decreasing the flow to plenum 2' and by increasing the flow to tire A' and decreasing the flow to tires B' and C'.

An alternative embodiment for the wheel construction, incorporating a self-contained source of air under pressure, is shown in FIG. 11. A high pressure air bottle 120 is mounted in a cup 121 and spider 122 carried in the hub 37. A pressure regulator 57 is mounted on the bottle 120 and a relief valve 54 is mounted in a plate 123 closing the outer end of the hub. A plurality of open orifices, as at 124, 125, are provided between the interior of the hub and the interior of the tire. In an alternative configuration, the interior of the hub could be divided into two chambers corresponding to the chambers 48, 49 of the embodiment of FIG. 3, with the check valves 53 and relief valves 54 carried in the hub.

Another alternative wheel construction is shown in FIG. 12, with an air compressor 130 mounted within the hub 37 to provide a source of air for the tire. The stator of the compressor may be fixed to the truck at 38, with the rotor attached to the hub by a plate 131. A line 132 provides an air inlet to the compressor. A regulator valve 57 may be carried on the plate 131, with a relief valve 133 mounted in the wall of the hub 37.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim:

1. In a vehicle for traversing a surface, the combination of:

an air cushion system mounted in the vehicle and including means defining a plurality of plenums for positioning at the surface;

a source of air under pressure for each of said plenums;

first control means for continuously and selectively controlling rate of flow of air to each of said plenums while the vehicle is moving along a surface with variations in plenum rates of flow varying the forces on the vehicle for maneuvering the vehicle on the surface;

a plurality of wheels for said vehicle, each of said wheels including a pneumatic tire;

a source of air under pressure for each of said tires;

second control means for continuously and selectively controlling pressure of air supplied to each of said tires while the vehicle is moving along a surface with variations in tire pressures varying the tire footprint area for varying traction forces of the tires;

each of said wheels including a relief valve mounted on the wheel separate from said second control means and responsive to motion of the tire over an obstacle to exhaust air from the tire;

with each of said relief valves responsive to an increase in pressure in the tire, opening to exhaust air from the tire as the tire volume is reduced by encountering an obstacle, and with said second control means including a pressure regulator for each tire upstream of the tire and responsive to a decrease in pressure in the tire, introducing air into tire as the tire volume increases after moving over an obstacle, with the relief valve and the pressure regulator of a tire controlling the tire pressure as the tire volume reduces and increases in passing over an obstacle;

with said second control means including means for selectively varying the output pressure setting of each regulator; and means interconnecting the relief valve and the regulator of a tire for varying the operating pressure of the relief valve as the pressure setting of the regulator is varied.

2. A vehicle as defined in claim 1 in which each of said pneumatic tires comprises spaced side walls joined by a peripheral tread for mounting on a hub and forming a non-rigid collapsible casing, and a plurality of generally radially disposed tension members separate from said casing and affixed at their outer ends to said tread and adapted at their inner ends to engage said hub, with the outside diameter of each of said tires several times the inside diameter of the tire, and with the tire casing readily deformable to a volume reduction of at least about one-third the normal inflated volume.

3. A vehicle as defined in claim 1 in which each of said pneumatic tires comprises a plurality of individual sections mounted side by side, each of said sections comprising an annulus with generally parallel sides joined by an inner sleeve and an outer tread forming a non-rigid collapsible casing, and a plurality of tension members interconnecting said sides of each casing, with the outside diameter of each of said tires several times the inside diameter of the tire, and with the tire casing readily deformable to a volume reduction of at least about one-third the normal inflated volume.

4. A vehicle as defined in claim 3 in which said outer tread is substantially wider than said inner sleeve.

5. In a vehicle for traversing a surface, the combination of:

an air cushion system mounted in the vehicle and including means defining a plurality of plenums for positioning at the surface;

a source of air under pressure for each of said plenums;

first control means for controlling rate of flow of air to each of said plenums;

a plurality of wheels for said vehicle, each of said wheels including a pneumatic tire;

a source of air under pressure for each of said tires;

second control means for controlling pressure of air supplied to each of said tires;

each of said wheels including a relief valve responsive to motion of the tire over an obstacle to exhaust air from the tire; and a controller for actuating said first and second control means simultaneously.

6. A vehicle as defined in claim 5 in which said controller includes a lever movable about a first axis for pitch control and about a second axis for roll control.

7. A vehicle as defined in claim 6 in which said controller lever is movable about a third axis for yaw control.

8. A vehicle as defined in claim 6 including means for varying the output of said source of air for said plenums and varying the rate of flow to all of said plenums simultaneously.

9. A vehicle as defined in claim 8 including means for varying the air pressure of all of said tires simultaneously.

10. A vehicle as defined in claim 5 in which said controller includes first means for varying plenum rate of flow as a first function of controller movement and second means for varying tire pressure as a second function of controller movement, and including third control means for changing each of said first and second functions.

* * * * *